(12) United States Patent
Lynk et al.

(10) Patent No.: US 8,584,026 B2
(45) Date of Patent: Nov. 12, 2013

(54) USER INTERFACE FOR ORIENTING NEW USERS TO A THREE DIMENSIONAL COMPUTER-GENERATED VIRTUAL ENVIRONMENT

(75) Inventors: John Chris Lynk, Kanata (CA); Arn Hyndman, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 593 days.

(21) Appl. No.: 12/344,686

(22) Filed: Dec. 29, 2008

(65) Prior Publication Data

US 2010/0169797 A1 Jul. 1, 2010

(51) Int. Cl.
*G06F 3/048* (2013.01)

(52) U.S. Cl.
USPC ......................................................... 715/757

(58) Field of Classification Search
USPC .................................. 715/757, 706
See application file for complete search history.

(56) References Cited

U.S. PATENT DOCUMENTS

| | | | | |
|---|---|---|---|---|
| 5,971,855 A * | 10/1999 | Ng | | 463/42 |
| 6,560,726 B1 * | 5/2003 | Vrhel et al. | | 714/55 |
| 7,223,174 B2 * | 5/2007 | Machida | | 463/43 |
| 7,386,799 B1 * | 6/2008 | Clanton et al. | | 715/758 |
| 7,467,356 B2 * | 12/2008 | Gettman et al. | | 715/850 |
| 2002/0054148 A1 | 5/2002 | Okada | | |
| 2002/0137566 A1 | 9/2002 | Tomizawa et al. | | |
| 2002/0154174 A1 * | 10/2002 | Redlich et al. | | 345/848 |
| 2002/0168616 A1 | 11/2002 | Chan et al. | | |
| 2003/0090515 A1 * | 5/2003 | Chang et al. | | 345/745 |
| 2004/0219980 A1 * | 11/2004 | Bassett et al. | | 463/33 |
| 2004/0255234 A1 | 12/2004 | Methot | | |
| 2004/0260569 A1 * | 12/2004 | Bell et al. | | 705/1 |
| 2005/0086612 A1 * | 4/2005 | Gettman et al. | | 715/848 |
| 2006/0284792 A1 * | 12/2006 | Foxlin | | 345/8 |
| 2007/0050719 A1 | 3/2007 | Lui et al. | | |
| 2007/0198128 A1 * | 8/2007 | Ziegler et al. | | 700/245 |
| 2007/0294622 A1 * | 12/2007 | Sterner et al. | | 715/716 |
| 2008/0108021 A1 * | 5/2008 | Slayton et al. | | 434/16 |
| 2008/0297587 A1 * | 12/2008 | Kurtz et al. | | 348/14.08 |
| 2008/0309671 A1 * | 12/2008 | Shuster et al. | | 345/474 |

(Continued)

OTHER PUBLICATIONS

Afro Samurai, http://ptgmedia.pearsoncmg.com/images/ 9780744010077/samplepages/1007-7_afrosamurai.pdf, 2006.*
Out of the Video Arcade, into the office: where computer games can lead productivity software, http://delivery.acm.org/10.1145/ 1190000/1189992/p18-larson.pdf?key1=1189992&key2= 6458085031&coll=DL&dl=ACM&ip=151.207.246.4&CFID= 23944888&CFTOKEN=44833432, 2007.*

(Continued)

*Primary Examiner* — Omar Abdul-Ali
*Assistant Examiner* — Haimei Jiang
(74) *Attorney, Agent, or Firm* — Anderson Gorecki & Rouille LLP

(57) ABSTRACT

When new users are first introduced to virtual environments, the new users may be confused and uncertain as to how to interact with the virtual environment. Several new user orientation features have been added to the virtual environment user interface to help orient new users to the three dimensional computer-generated virtual environment and to prevent the new users from making common mistakes. Example beginning user orientation features include clearly distinguishing when the user is interacting with the virtual environment and when the user is interacting with virtual environment application controls, limiting the vertical field of view of the new user's Avatar to prevent the user from becoming stuck looking straight up or straight down, providing the user with visual feedback when switching between first and third person points of view, and providing the user with clear instructions as to how to control their Avatar and how to reenter the virtual environment.

16 Claims, 7 Drawing Sheets

(56) References Cited

U.S. PATENT DOCUMENTS

2009/0132920 A1* 5/2009 Deyo et al. .................... 715/708
2009/0221367 A1* 9/2009 Longley et al. ................. 463/32
2009/0276105 A1* 11/2009 Lacaze et al. ..................... 701/2
2010/0156906 A1* 6/2010 Montgomery et al. ....... 345/427
2011/0007139 A1* 1/2011 Brunetti .......................... 348/51

OTHER PUBLICATIONS

International Search Report and Written Opinion of the International Searching Authority from corresponding PCT application PCT/CA2009/001840.

Corrected Version of International Search Report from corresponding PCT application PCT/CA2009/001840.

* cited by examiner

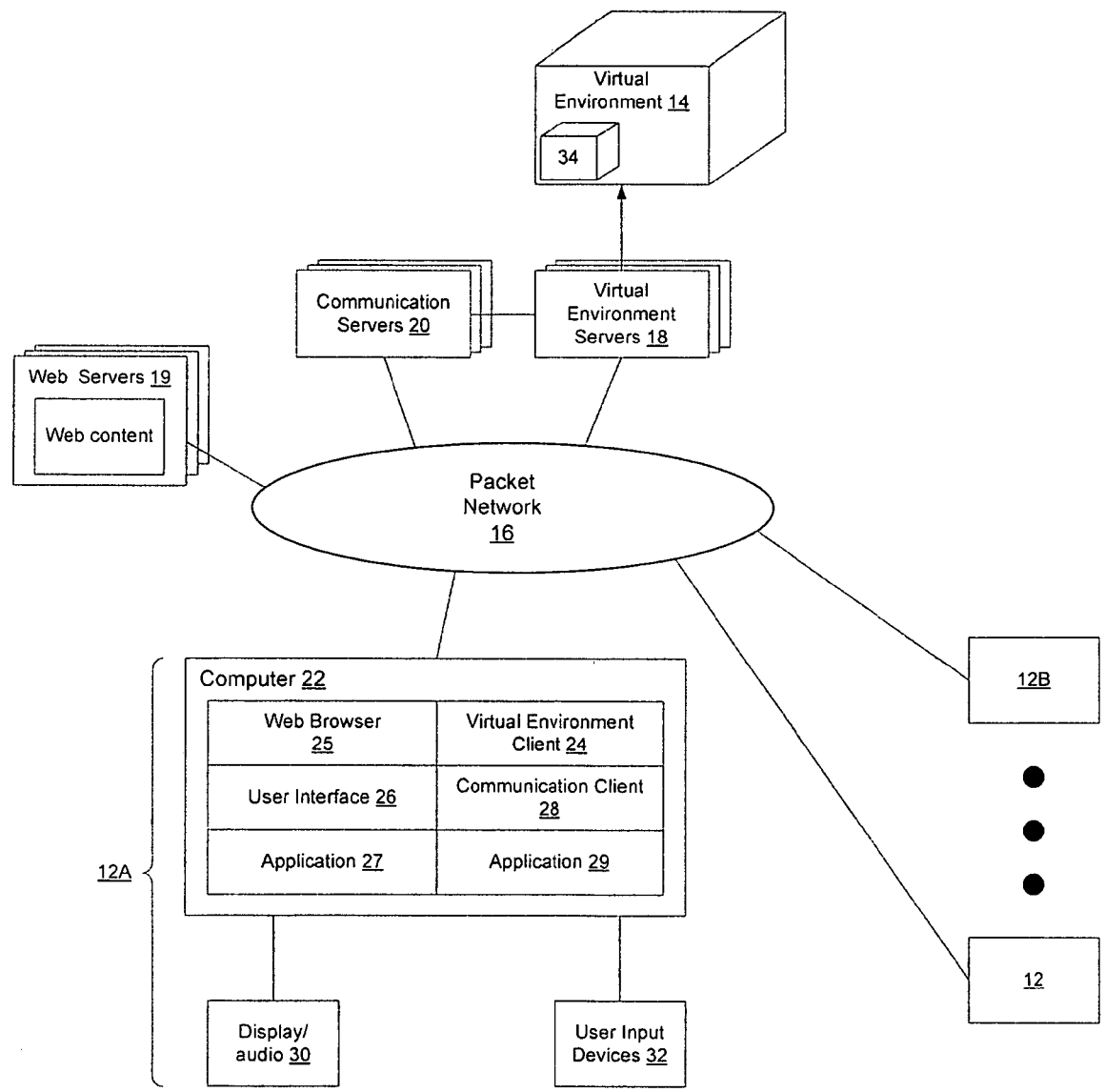

USER INTERFACE FOR ORIENTING NEW USERS TO A THREE DIMENSIONAL COMPUTER-GENERATED VIRTUAL ENVIRONMENT

CROSS-REFERENCE TO RELATED APPLICATIONS

None

BACKGROUND OF THE INVENTION

1. Field of the Invention

The present invention relates communication sessions and, more particularly, to a user interface for orienting new users to a three dimensional computer-generated virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client, which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, business collaboration, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

Many computer users have been exposed to two dimensional computer interfaces that are commonly used for applications such as word processors, spreadsheets, web browsers, etc. However, very few users have used modern gaming applications and still fewer have used virtual environments. Consequently, the complexity of a virtual world interface represents a serious potential barrier to mainstream adoption of virtual worlds in every-day computing. Users may be overwhelmed by the visual complexity of the 3D environment and may be unable to separate the menuing systems from the virtual environment display. As a consequence, users may be either fully engaged in the virtual environment or may be not engaged at all. In a business context, where users may need to toggle between traditional application interfaces and the virtual environment interface, either of these extremes is undesirable.

One solution that has been used to address this problem is to make all navigation controls keyboard and button (screen icon) based. In this solution the mouse does not directly control avatar navigation, but is used to click on menu buttons in order to invoke specific navigation controls. For example, the user would click a lookup button in order to make their Avatar look up. The disadvantage of this solution is that interaction is very unnatural. The user cannot easily look around and, therefore, the user does not feel as immersed in the virtual environment. Another solution used in video games to teach users advanced controls is to force the user to complete an initial training level where the new users are forced to complete a series of tasks in order to train them to navigate. This solution has the disadvantage that it introduces a significant delay between when the user decides to enter a virtual environment and the point at which they actually get to participate in that particular virtual environment. Accordingly, it would be advantageous to provide another way to orient new users to three dimensional virtual environments.

SUMMARY OF THE INVENTION

When new users are first introduced to virtual environments, the new users may be confused and uncertain as to how to interact with the virtual environment. According to an embodiment of the invention, new user orientation features are added to the virtual environment user interface to help orient new users to the three dimensional computer-generated virtual environment and to prevent the new users from making common mistakes. Example beginning user orientation features include clearly distinguishing when the user is interacting with the virtual environment and when the user is interacting with virtual environment application controls, limiting the ability of the user to look up/down to prevent the user from becoming stuck, providing the user with visual feedback when switching between first and third person point of view, and providing the user with clear instructions as to how to control their Avatar and how to reenter the virtual environment.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 1 is a functional block diagram of a portion of an example system that may be configured to provide a user interface that can orient new users to a three dimensional computer-generated virtual environment according to an embodiment of the invention;

DETAILED DESCRIPTION

Figure 2A:
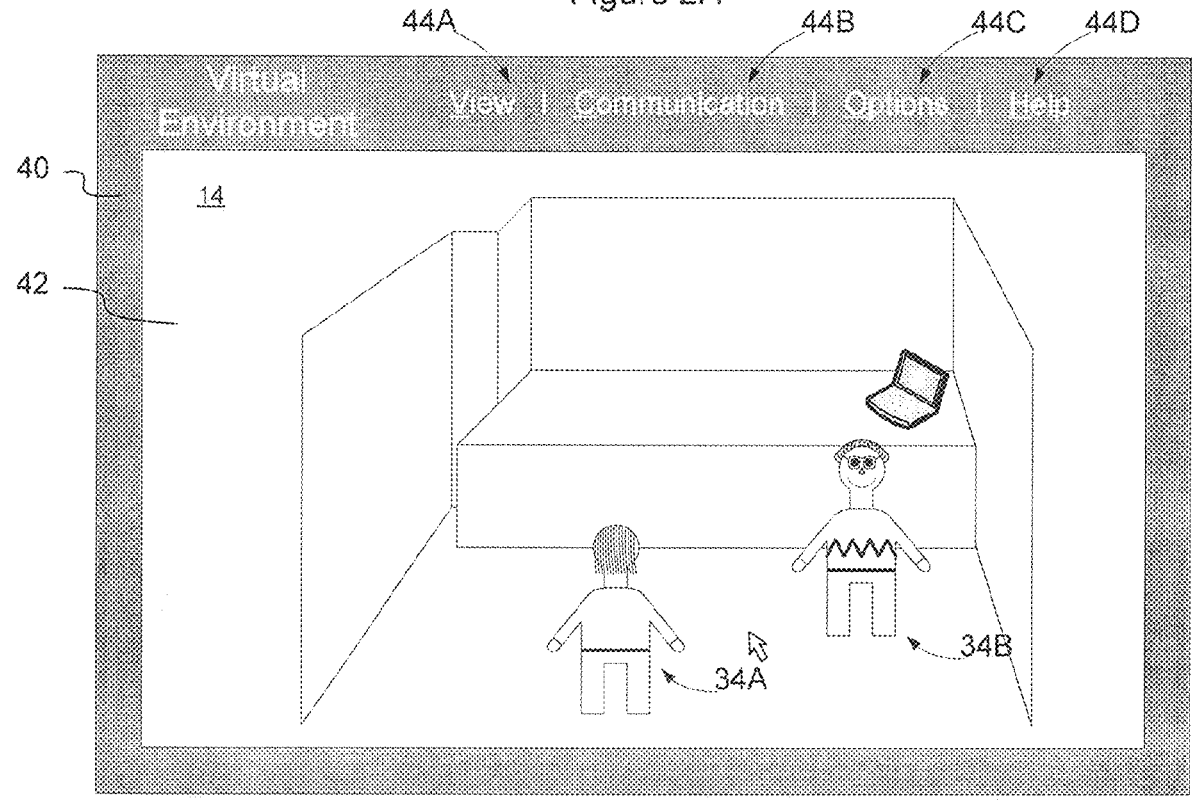
FIGS. 2A-2B show an example of the user interface that can enable users to easily determine whether they are interacting with the three dimensional content of the virtual environment or with controls provided by the three dimensional visual environment application.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

FIG. 1 shows a portion of an example system 10 that may enable a user 12 to access a three dimensional computer-generated virtual environment. According to an embodiment of the invention, the system can provide new users with a user interface that is designed to orient new users to a three dimensional computer-generated virtual environment. Aspects of the user interface are discussed in greater detail below. As the users become facile with the user interface, some of the features or all of the features discussed herein may be modified or turned off since these features may be of less use to an experienced user. However, by default, it is preferable for some or all of these features to be included in the user interface when a new user is introduced to the virtual environment so that the user is able to be guided during the orientation period until the new user understands how the user interface operates and how it can be used to control the user's Avatar and otherwise interact in the virtual environment.

In the example shown in FIG. 1, a user 12 may access the virtual environment 14 from their computer 22 over a packet network 16 or other common communication infrastructure. The virtual environment 14 is implemented by one or more virtual environment servers 18. Communication sessions between the users 12 may be implemented by one or more communication servers 20.

The virtual environment may be implemented as using one or more instances, each of which may be hosted by one or more virtual environment servers. Where there are multiple instances, the Avatars in one instance are generally unaware of Avatars in the other instance. Conventionally, each instance of the virtual environment may be referred to as a separate World. Avatars in a given world are allowed to communicate with other users that also have Avatars in the same world over a communication session hosted by the communication server 20.

The virtual environment 14 may be any type of virtual environment, such as a virtual environment created for an on-line game, a virtual environment created to implement an on-line store, a virtual environment created to implement an on-line training facility, for business collaboration, or for any other purpose. Virtual environments are being created for many reasons, and may be designed to enable user interaction to achieve a particular purpose. Example uses of virtual environments include gaming, business, retail, training, social networking, and many other aspects.

Generally, a virtual environment will have its own distinct three dimensional coordinate space. Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar (first person), or whether the user has opted to pan back from the Avatar to see a three dimensional view of where the Avatar is located and what the Avatar is doing in the three dimensional computer-generated virtual environment (third person).

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. As discussed below, the user interface may be modified to enable new users to the virtual environment to more easily become oriented to the virtual environment and controls in the virtual environment. The user computer may be running any number of other applications as well. For example, in the illustrated example the user's computer 22 has a web browser 25 open which is obtaining and displaying web content from a web server 19. Other applications 27, 29, may be open on the computer as well.

A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. In this way the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, fly or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

When new users are first introduced to virtual environments, the new users may be confused and uncertain as to how to interact with the virtual environment. Low cost usability testing on several small groups of people (3 tests of 5 users per test) revealed that a very high percentage of people with no experience in 3D virtual worlds experience several problems. Specifically, it was found that test subjects, that were selected from a population of post secondary educated and computer literate people, but which had no experience with virtual world interfaces, experienced the following problems:

Difficulty distinguishing between the virtual environment and the control interface;

Difficulty understanding the association between mouse motion and avatar motion in $3^{rd}$ person views;

Difficulty understanding "who am I" in first person views;

Losing track of which way is up when an over large mouse motion causes POV to be straight up or down and then being unable to get out of that state;

Difficulty finding and using basic navigation controls—the industry standard "wasd"; and Difficulty switching between the virtual world, other applications, and back.

These difficulties rendered it difficult for new users to effectively negotiate the virtual environment and use the virtual environment as a business application. To overcome these difficulties that initial users were having, several modifications to the user interface, discussed below in connection with FIGS. 2-6, were made and tested on new sets of subjects. These modifications were found to eliminate or significantly alleviate many of these initial problems.

Distinguishing Between Virtual Environment and Control Interface

FIG. 2 shows an example display shown by a virtual environment client when a user is logged into a virtual environment supported by a virtual environment server 18. In the example shown in FIG. 2, the display includes a control area 40 and a three dimensional computer-generated virtual environment 42. In the illustrated example, the user is represented by an Avatar 34A who may interact with objects and other Avatars in a three dimensional computer generated virtual environment.

During testing, all of the test subjects were unsure about which elements of the interface to interact with. This was evidenced in their verbal protocol and in their searching or scanning behaviors over complete screen areas within the application.

Based on this, an evaluation was made that new users to virtual worlds where overwhelmed by the complex stimulus of the 3D environment and surrounding interface. With no experience with the conventions of such systems, users were not able to determine which parts of the screen might be interactive or how to interact with them.

In order to solve this problem, user tasks were separated into two categories: (1) Navigation within the virtual environment (where the user focus should be on the content of the three dimensional virtual environment); and (2) Interaction with the other controls and functions of the virtual world interface (where the user's focus should be on the controls provided by the virtual environment application). To guide new users to focus their attention on the three dimensional content or on the application controls, the user interface was designed to shift the user's focus depending on which task the user was performing. When the user was controlling their avatar within the three dimensional virtual environment, the contrast of the interface controls was reduced by graying out the controls and surrounding area in a manner similar to how disabled controls are displayed in traditional office applications. When the user was not controlling their avatar, and instead was required to interact with one of the controls provided by the virtual environment application, the user's attention was shifted away from the virtual environment to the control interface by reducing the contrast of the virtual environment and increasing the contrast of the interface.

Figure 2B:

An example of how the user focus may be shifted between the three dimensional content and the application controls is shown in FIGS. 2A and 2B. As shown in FIG. 2A, the user may control the motion of their Avatar in the virtual environment by using various combinations of keystrokes and mouse input. When the user is interacting with the virtual environment user interface in this manner, the surrounding border and controls provided by the virtual environment application are grayed out so that the user may be prompted to not interact with those controls and instead focus the user's attention on the three dimensional content.

As shown in FIG. 2B, the user may also interact directly with the virtual environment client by clicking on one of the menus 44A-44D available in the control area 40. In the illustrated example, the control area includes a view menu 44A that will enable the user to switch between first and third person points of view, a communication menu 44B that provides the user with various options for communicating with other users; an option menu 44C that allows the user to control how the Avatar moves, what features should be available, whether the beginning user controls should be turned on/off (See FIG. 7) and other types of things that may be controlled to change operation of the virtual environment and the Avatar within the virtual environment; and a help menu 44D that enables the user to access help on particular features of the virtual environment. Other menus may be provided as well.

As noted above, new users are likely to be confused as to when they are interacting directly with the virtual environment and when they are interacting directly with the virtual environment client via the control area. To solve this difficulty, applicants proposed to gray-out the control area when the user is interacting with the virtual environment, and to gray out the virtual environment when the user is interacting with the control area. A prompt such as "click to control your Avatar" may be provided over the grayed-out virtual environment to help the user learn how to regain control over their Avatar in the virtual environment. Graying out the aspect of the virtual environment display that is not in use enables the user to intuitively focus on the aspect of the virtual environment display that is being used.

In the study groups, this very explicit mechanism to shift the user's focus proved effective. Users were started in interaction mode and were clearly able to find and click on the relevant interface elements. Once users moved into navigation mode they ignored the interface and focused on the 3D environment.

Switching Between First and Third Person Points of View

Figure 3A:
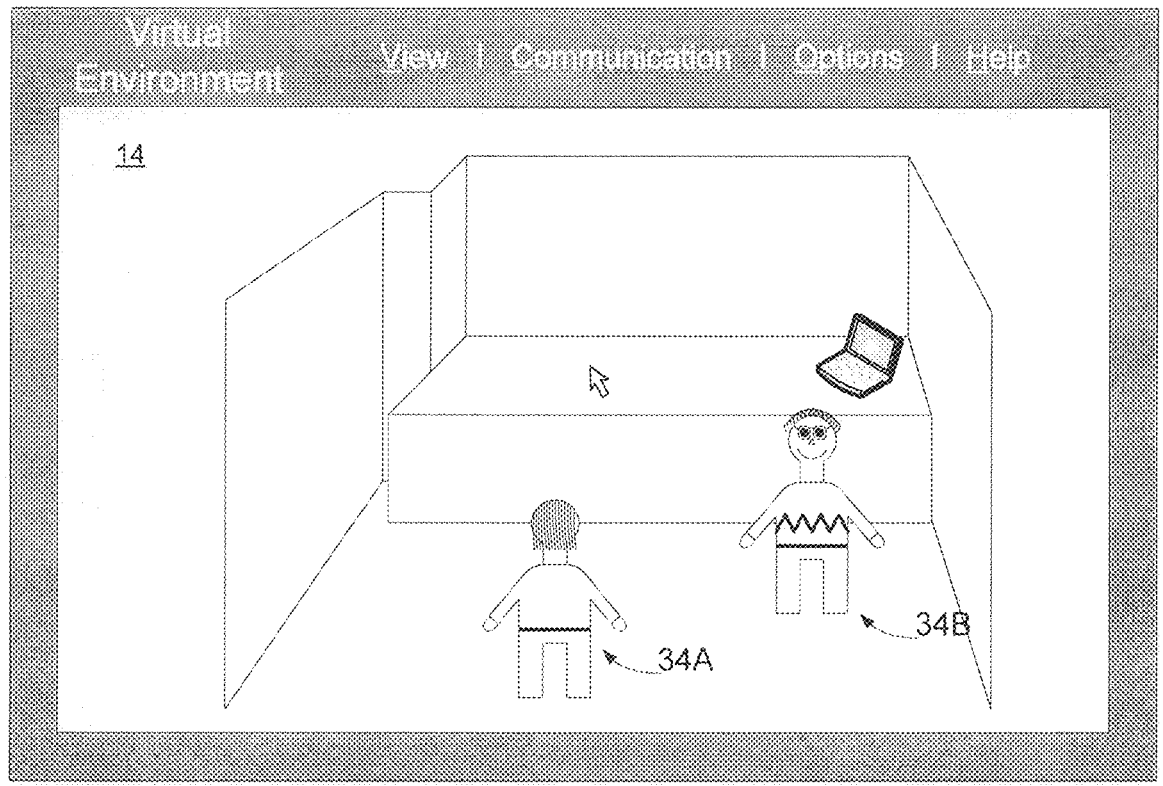
FIGS. 3A-3B and FIGS. 4A-4F show an example of the user interface that enables a user to easily toggle between first person and third person views according to an embodiment of the invention.

Many virtual environments allow a user to toggle between a third person point of view and a first person point of view. A third person point of view is a display that enables the user to look into the virtual environment from a point above and behind the user's Avatar, so that the user's Avatar is visible to the user. FIG. 3A shows an example virtual environment as it would be seen by the user when using a third person point of view. The third person point of view may also be adjusted to see other angles relative to the Avatar such that the user is not always looking at the Avatar's back. The term "third person point of view" will be used to refer to a view that enables the user to see both the virtual environment and their Avatar within the virtual environment.

Figure 3B:
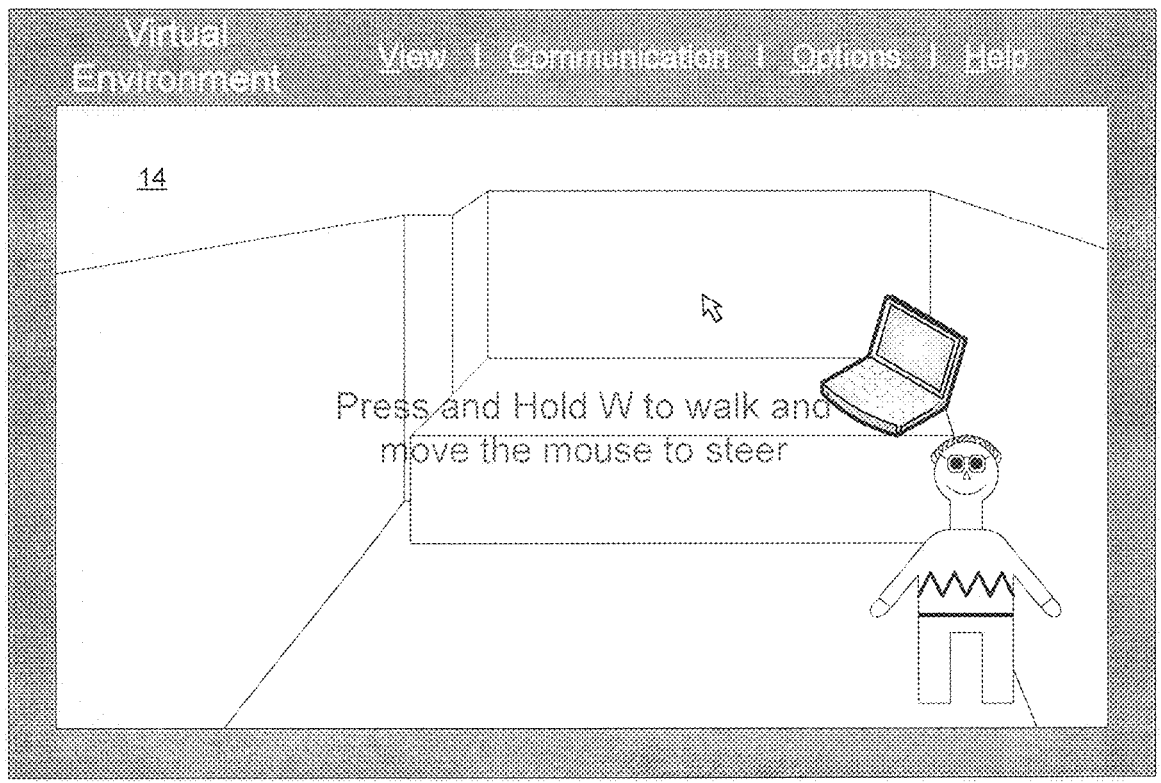

A first person point of view provides a view into the virtual environment as if the user is looking through their Avatar's eyes into the virtual environment. FIG. 3B shows how a view of the example virtual environment may appear in first person point of view. Notice, in FIG. 3B, that the user's Avatar 34A does not appear on the display and is not visible to the user.

During testing, when users were presented with a third person point of view, with a virtual camera positioned above and behind the Avatar, the test subjects had difficulty understanding the relationship between moving their mouse and the movement of their avatar (and the corresponding movement of the camera). The resulting frustration led users to abandon the mouse and attempt to move their avatars via keyboard alone.

In first person POV, subjects more quickly and easily understood the relationship between mouse motion and the results on screen, but at first felt unsure of where "they were"—subjects looked at other avatars on the screen and asked which avatar was theirs.

To solve these problems, according to an embodiment of the invention, a virtual camera may be caused to fly in toward the user's avatar when switching from third to first person perspective. The reverse process may be used as well, when shifting from first to third person perspective, to cause the virtual camera to fly backwards away from the user's Avatar. This process allows the user to get an initial sense of who they are, while at the same time allowing them to leverage the benefits of a more direct and easy-to-understand relationship between mouse motion and on screen response.

Figure 4A:
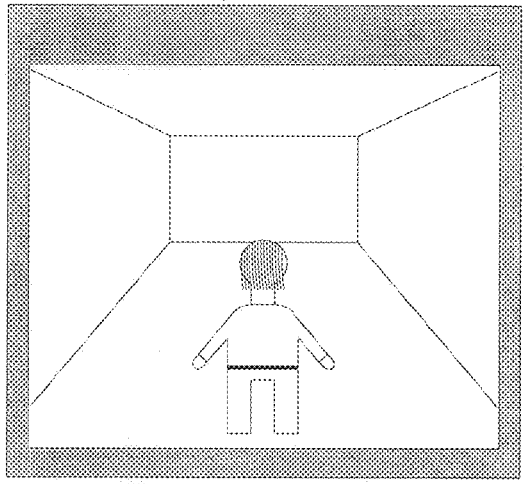
Figure 4B:
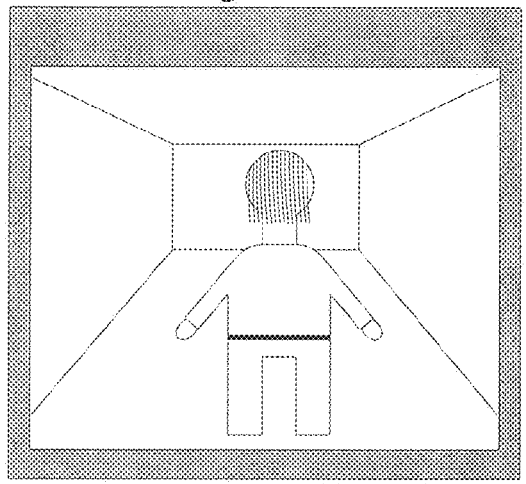
Figure 4C:
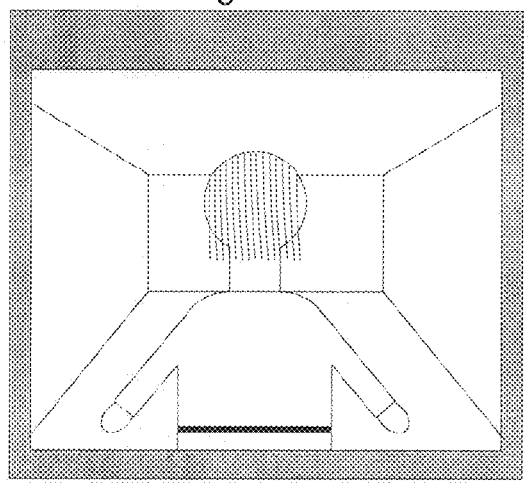
Figure 4D:
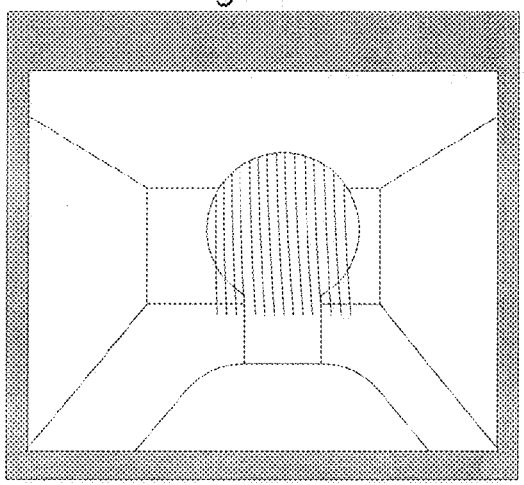
Figure 4E:
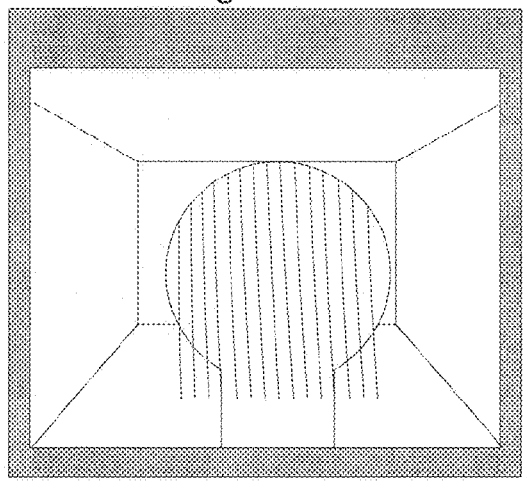
Figure 4F:
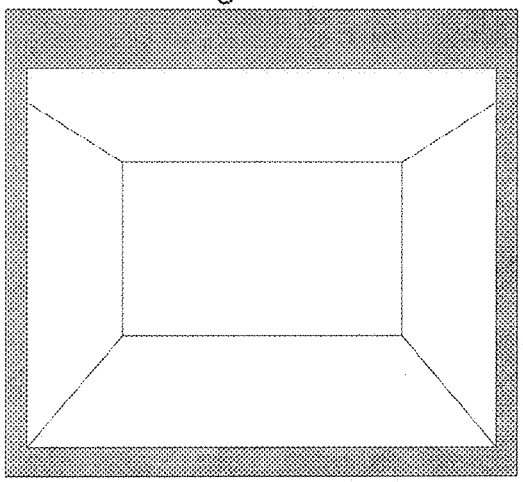

FIGS. 4A-4F show an example representation of how the virtual camera may be caused to fly in on the user's Avatar to end with a first person perspective. In FIG. 4A, the user is in third person point of view and the user is able to see their Avatar from behind. Assume that the user elects to switch to first person point of view. The view of the three dimensional virtual environment is treated as if the user were looking through a camera behind the Avatar that is getting closer to their Avatar. FIGS. 4B, 4C, 4D, and 4E show successive views as the virtual camera gets closer to the user's Avatar 34A until the view is in first person point of view, with the user looking into the virtual environment as if they were the Avatar. This provides the user with a graphic understanding of how the point of view switched from third to first person, and the relationship between the points of view. It also helps the user understand that they are being presented with a view into the virtual environment from their Avatar's point of view.

This example demonstrates a straight fly in path from behind the avatar. Other possible fly-in paths are possible to highlight the different features of the avatar. For example, the fly in could start facing the Avatar so that the facial features of the Avatar are viewable, and then proceed around the avatar to enter from the back of the avatar's head.

When the user opts to toggle from first person to third person, the reverse action may take place. For example, the view presented to the user would start at FIG. 4F, and then move successively backward to FIG. 4E, 4D, etc., until the user is shown the view shown in FIG. 4A. This also helps the user figure out which Avatar is theirs and how the two points of view are related.

In one embodiment, the manner in which the user is allowed to switch from $1^{st}$ person to $3^{rd}$ person viewpoint occurs naturally as the person uses their mouse wheel to control the zoom functionality. In this embodiment, when zooming out in $1^{st}$ person there is a point where the viewpoint automatically switches into $3^{rd}$ person view, effectively moving the camera out behind the user as they zoom out. Similarly, when zooming in while in $3^{rd}$ person view, there is a point where the user is automatically switched into 1St person view to effectively move the camera into the Avatar's head as if the user is now looking through the avatar's eyes.

Difficulty with Discovering Controls

Users that are not familiar with virtual environments may have difficulty discovering controls or remembering how the controls work. Currently, one standard way for users to control their Avatar while in the first person point of view, is to require the user to hold down a key to move forward in the direction they are looking, while controlling the direction that the Avatar is looking with the mouse.

However, users unfamiliar with virtual worlds were also unfamiliar with these controls. Even if a guide to the controls was displayed to the users during startup, users didn't notice or didn't retain the information later when they needed to navigate. Users attempted to move their avatars with the mouse (unsuccessfully as mouse motions control the direction that the Avatar is looking) and eventually with the arrow keys. Once users found a key that worked they abandoned the mouse and focused on the keyboard.

A first attempt at solving the problem was to display a prompt in the center of the screen that said "press W to walk". However, subsequent testing showed that users tapped the navigation keys, moving their avatars one step at a time instead of holding the keys for a continuous walking motion. Users also continued to avoid using the mouse. In another iteration the prompt was updated to say "hold W to walk and move the mouse to steer". Subsequent testing indicated that this solved the problem. For example, as shown in FIG. 3B, the prompt may be overlayed over the virtual environment using semitransparent text to enable the user to be instructed how to discover and use basic navigation controls without assistance.

Other messages may be provided to the user as well. For example, the user may be presented with a prompt such as "Press escape to see your mouse" while in navigation mode. This prompt helps the user learn how to switch out of avatar navigation mode into menu mode (i.e. where they can interact with the virtual environment client application controls).

Point of View Stuck in Vertical

Another difficulty encountered by the users in the pilot study was that users felt that they lost control of the direction in which they were looking and then got stuck. This occurred when the user moved their mouse too far along the vertical axis such that they wound up looking straight down at the ground or straight up at the sky. These kinds of vertical mouse motions are quite easy to do by accident when wiggling the mouse in an attempt to locate your mouse cursor or when lifting the mouse to reposition it relative to the mouse pad.

When a user does this, and looks straight up or straight down, the user is typically presented with a featureless blue sky or relatively featureless floor. The end result is that the user feels disoriented. To make matters worse there is only one of 4 directions (up, down, left, right) they can move the mouse to return to a more normal horizontal view point.

Figure 5A:
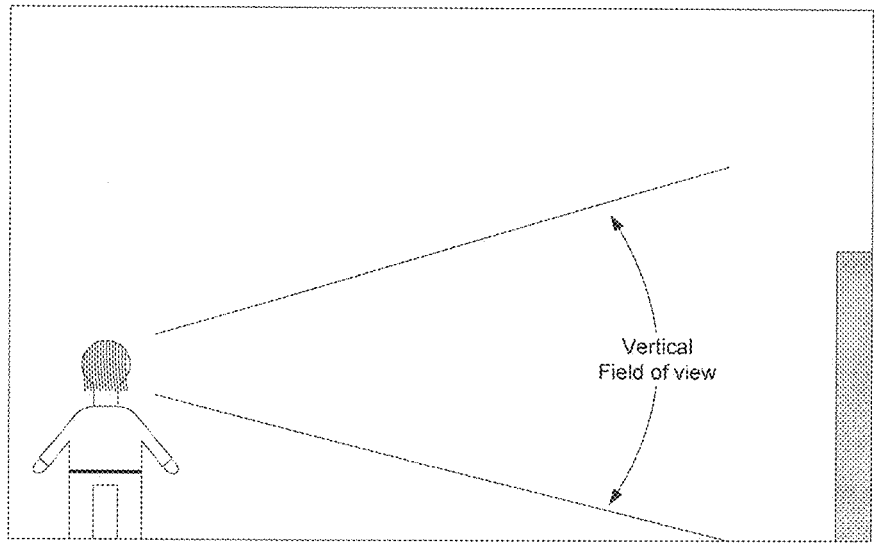
FIGS. 5A-5C show an example of the user interface in which the Avatar's vertical field of view is restricted, and in which the vertical restriction depends on the Avatar's position relative to other objects in the virtual environment.
Figure 5B:
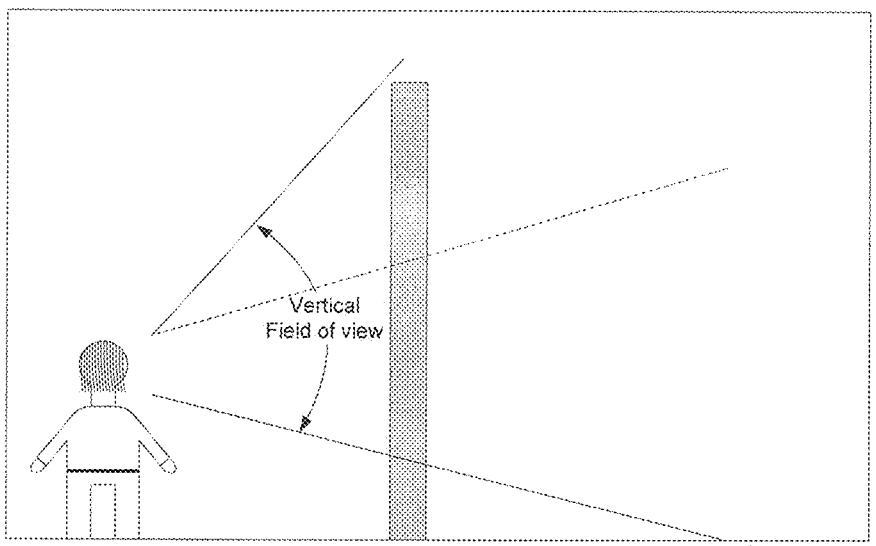
Figure 5C:
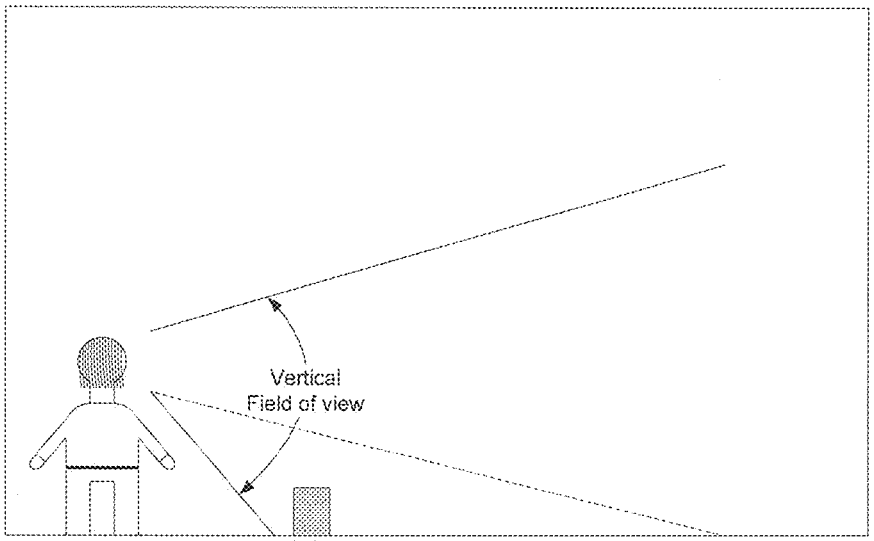

FIGS. 5A-5C show one way to solve this problem. Specifically, according to an embodiment of the invention, limitations are placed on how far the user can look up or down such that the horizon is always visible. For example, as shown in FIG. 5, the vertical field of view may be limited for new users so that the user always has a portion of the horizon in their field of view. This enables the user to remain oriented vertically. This proved to be effective, in subsequent testing, in ensuring that the users didn't get "stuck" looking up at the sky or down at the ground.

FIGS. 5B and 5C show several ways in which the vertical field of view may be adjusted as the user negotiates the virtual environment. As shown in FIG. 5B, when a person encounters a tall object, the restricted vertical field of view may not allow the person to see the top of the tall object. Accordingly, as the person gets closer to the tall object, the upper limit of the vertical field of view may be increased to enable the user to see higher up toward the top of the tall object. The normal upper limit on the vertical field of view is shown by the dashed line in FIG. 5B. As shown by the solid line, as the user gets closer to the tall object the upper angular limit on the vertical field of view may be increased to enable the user to look up at a larger angle.

Similarly, as shown in FIG. 5C, the normal vertical field of view may not enable the user to see small objects on the ground if the user is too close to the small object. Accordingly, as the person gets closer to the short object, the lower limit of the vertical field of view may be increased to enable the user to see lower down toward the ground. The normal lower limit on the vertical field of view is shown by the dashed line in FIG. 5C. As shown by the solid line, as the user gets closer to the small object the lower angular limit on the vertical field of view may be increased to enable the user to look down at a larger angle.

Optionally both upper and lower angular limits may be adjusted as the user encounters objects and has a need to view the objects. Thus, as the user walks around, the upper and lower angular limits may be adjusted as needed to enable the user to see various objects while protecting the user from getting stuck looking at the sky or straight down at the ground. The upper and lower angular limits may also be manually adjusted by the user if desired so that, as the user becomes more adept at using the virtual environment, the user may remove or increase the vertical field of view restrictions.

Moving Between the Virtual Environment and Other Applications

Computer users in a business environment frequently may have more than one application open at a particular time. For example, a person may have an e-mail program open to receive e-mail messages from co-workers and may be using a spread-sheet or word processing program at the same time. As virtual environments become more commonplace, users will need to be able to switch between traditional applications and virtual environment applications and between virtual environment applications. According to an embodiment of the invention, the virtual environment application may be grayed-out when not in use to enable the user to know that their Avatar is not active in the virtual environment. Since other users may continue to be active in the virtual environment, graying out the interface also substantially prevents the user from seeing into the virtual environment so that they are not distracted by activities occurring within the virtual environment. The virtual environment may flash or otherwise draw the user's attention when their resumed presence is required in the virtual environment. Additionally, a notification icon balloon, commonly referred to as Toast, may be used to get the user's attention or to nudge the user to return to the virtual environment.

Figure 6:
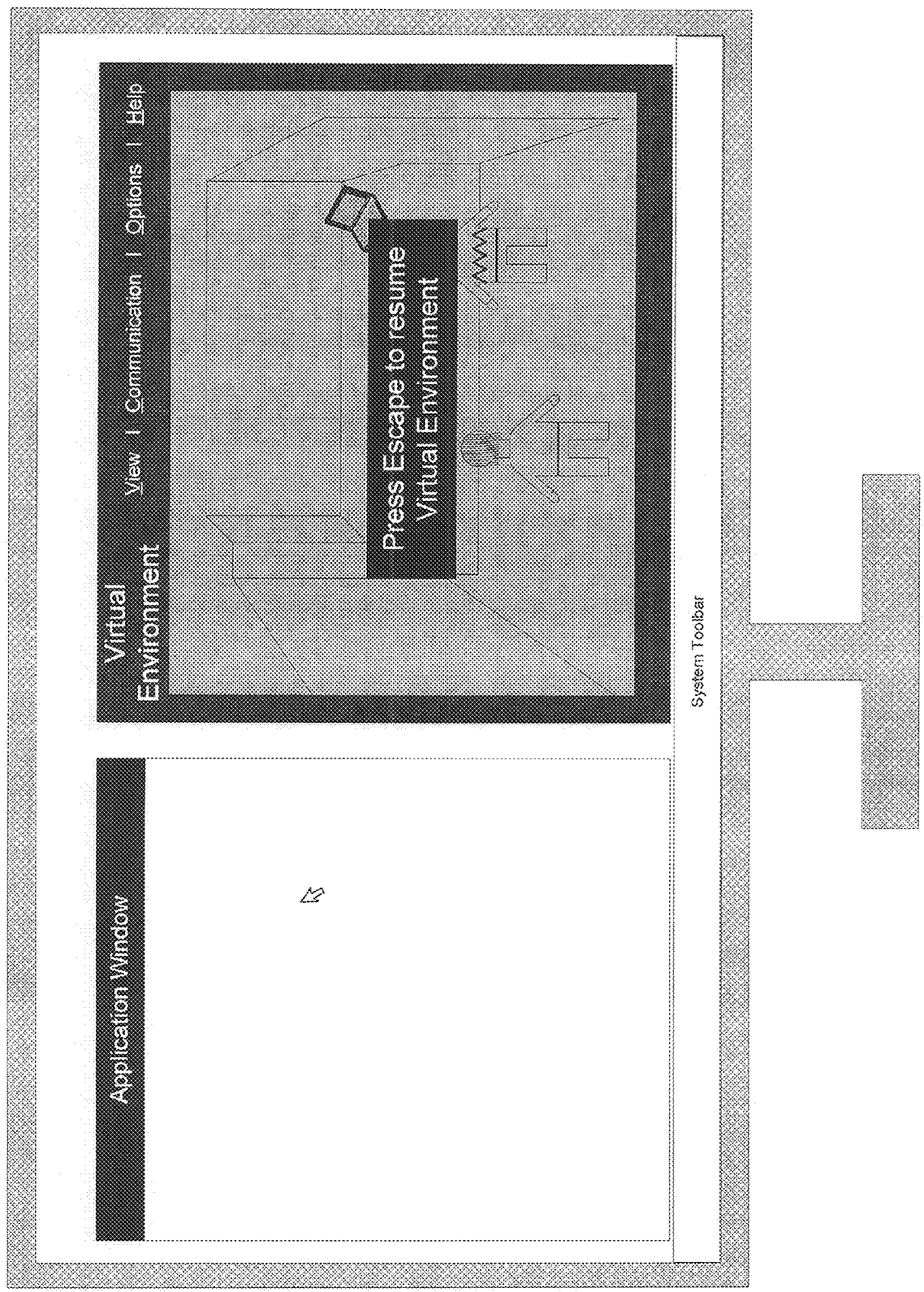
FIG. 6 shows an example of the user interface in which the Avatar is able to toggle between the virtual environment application and other applications running on the user's computer according to an embodiment of the invention.

FIG. 6 shows an example display in which the user has an active application window and an inactive virtual environment. As shown in FIG. 6, the virtual environment application may cause a message such as "press escape to resume virtual environment." When the user moves their mouse over the virtual environment and presses escape, the user may regain control over their Avatar in the virtual environment. This type of message helps users discern when they are active in the virtual environment and instructs them how to resume activity in the virtual environment. If another user would like the user to re-enter the virtual environment, a notification may be presented on the virtual environment interface such as to cause the interface to blink, cause a special message to appear, or otherwise to attract the user's attention.

Figure 7:
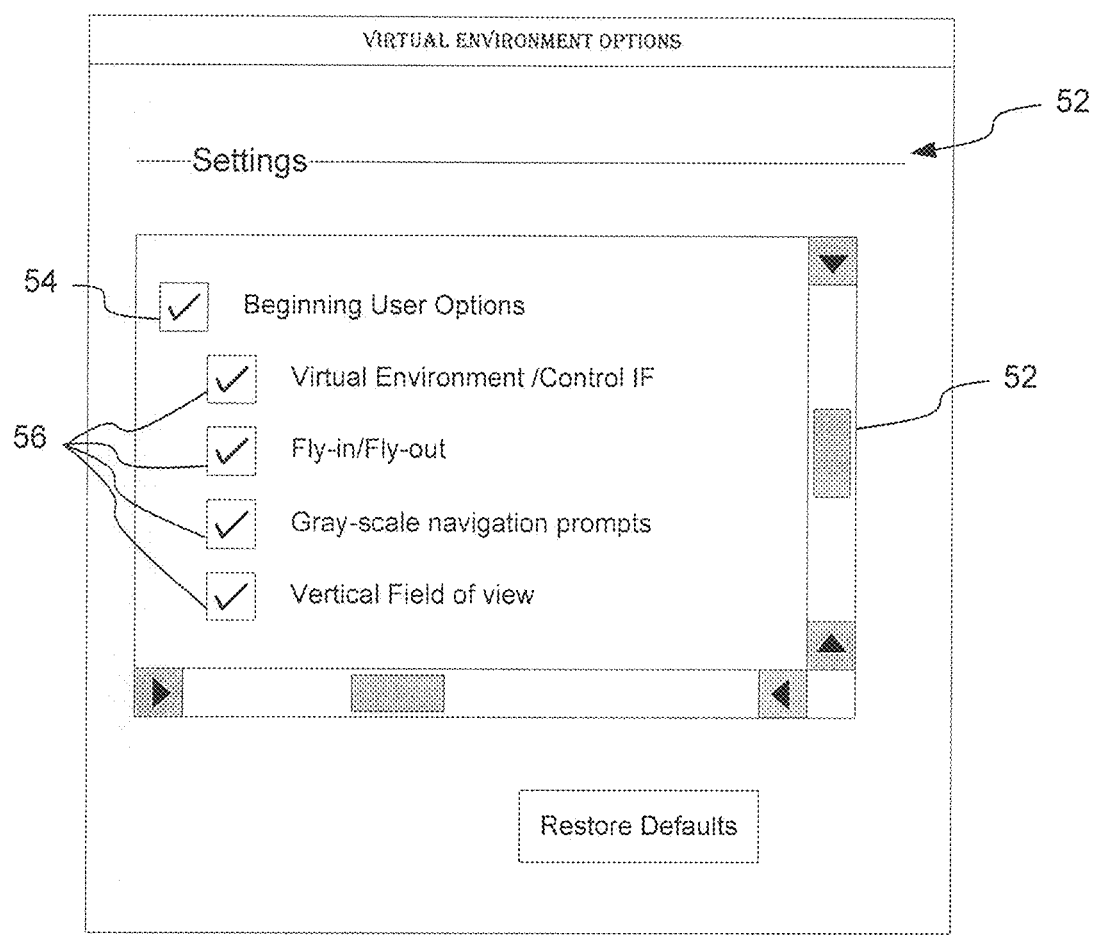
FIG. 7 shows an example user interface that may be used to enable the user to control the beginner user options according to an embodiment of the invention.

Once a user becomes accustomed to using a virtual environment, the user may not need to be guided using one or more of the beginning user orientation features described herein. Accordingly, the user may desire to disable one or more of these features. FIG. 7 shows an example virtual environment control panel screen that may be used to allow the user to control which of the beginning user orientation features is active and which is turned off. The beginning user orientation features are preferably all active by default.

As shown in FIG. 2A, the virtual environment control area 40 may include an options menu 44C that will allow the user to specify particular operational features of the virtual environment. The beginning user orientation features described herein may be accessible through that options menu 44C or through another control feature of the virtual environment. In the example shown in FIG. 7, the virtual environment options menu has a settings tab 50 through which the beginning user orientation features 52 may be turned on/off. In the illustrated embodiment, a master toggle box 54 may be used to turn on/off all of the features, and individual toggle boxes 56 may be used to turn off individual features. For example, the user may elect to individually turn on/off the various beginning user orientation features described above. Where other beginning user orientation features are included in the virtual environment, those features may be provided as well.

In one embodiment, different user interfaces may be provided to different users depending on the experience level of the user. As the user gains experience, additional buttons may be added. Similarly, particular users may not want to have a virtual environment interface with a large number of icons that they don't know how to user or want to learn how to use. As users start to learn how to use the virtual environment, they may be presented with a limited feature set and then continue to add features as the program senses that they have mastered that set of controls. In one embodiment, the location of the previous controls will not change as new controls are provided to the user. This enables the user to learn how to use a particular control and where to look for that control, which will remain unchanged as additional features are made available to the user.

Preferably, the user interface would be more customizable as well so that the user could tailor the interface to the manner in which they use it. For example, a person who tends to spend most of their time interacting with other applications may wish that there be a bias toward interacting with the application instead of navigating their avatar. Some people may be happy just to teleport to a particular meeting location so they can hear the presentation without actually having to navigate their avatar. Such user could attach their avatar to another person's avatar (a feature we've referred to as "follow me" or "follow them") and not have to worry about the navigation aspects of the interface.

Although particular modules and pieces of software have been described in connection with performing various tasks associated with enabling external content to be included in a three dimensional computer-generated virtual environment, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of orienting a new user to a three dimensional computer-generated virtual environment supported by a virtual environment application, the method comprising the steps of:
   initially presenting the new user with a beginning-user graphical user interface when the new user first starts to use the virtual environment application, the beginning-user graphical user interface being designed to indoctrinate the new user to the virtual environment;
   enabling the new user to selectively turn on and off individual aspects of the beginning-user graphical user interface to selectively enable the new user to control which aspects of the beginning-user graphical user interface are used to control interaction between the new user and the virtual environment; and
   as individual aspects of the beginning-user graphical user interface are disabled, enabling corresponding features of an advanced-user graphical user interface to enable the new user to control a transition from the beginning-user graphical user interface to the advanced-user graphical user interface;
   wherein the beginning-user graphical user interface is divided into two portions, a first portion created to show content of the virtual environment, and a second portion created to contain controls of the virtual environment application, the beginning-user graphical user interface being created such that only the first portion or the second portion is active and available for use by the new user at any one point in time, and wherein when one of the two portions is active and available for use, an appearance of the other of the two portions is altered to visually indicate to the new user that the other of the two portions is not active or available for use;
   wherein the beginning-user graphical user interface enables the new user to toggle between first and third person viewpoints, and wherein when the new user toggles from third person viewpoint to first person viewpoint a virtual camera representing the user flies in toward and ends at an Avatar representing the new user in the virtual environment to visually show the new user which Avatar represents them in the virtual environment;

wherein the beginning-user graphical user interface has a vertical field of view restriction so that the new user is always able to see a horizon within the virtual environment; and wherein the beginning-user graphical user interface has a limited set of controls, and as the new user becomes more adept at interacting in the three dimensional computer-generated virtual environment the set of controls is increased to provide the new user with control over additional features of the virtual environment application.

2. The method of claim 1, wherein the appearance is altered by graying out the portion that is not active or available for use.

3. The method of claim 2, wherein a prompt is displayed to indicate how to switch between interacting with the two portions.

4. The method of claim 3, wherein the prompt is textual and is continuously displayed.

5. The method of claim 1, wherein the virtual camera fly-in starts in the back of the Avatar to fly into the back of the Avatar's head.

6. The method of claim 1, wherein the virtual camera fly-in starts in front of the Avatar to show the new user what their Avatar looks like in the virtual environment.

7. The method of claim 6, wherein the virtual camera fly-in spirals around the Avatar to fly into the back of the Avatar's head to enable the new user to see what the Avatar is seeing in the virtual environment.

8. The method of claim 1, wherein the new user may toggle between first and third person viewpoints using a zoom vision control.

9. The method of claim 8, wherein the zoom vision control is a mouse wheel.

10. The method of claim 1, wherein the virtual environment uses first person viewpoint by default, but when the new user first enters the virtual environment, the virtual camera representing the new user flies in toward and ends at the Avatar representing the new user in the virtual environment to visually show the new user which Avatar represents them in the virtual environment.

11. The method of claim 10, wherein the virtual camera fly-in occurs when the new user first clicks on the virtual environment.

12. The method of claim 1, wherein the vertical field of view restriction is implemented when the new user is viewing the virtual environment in first person viewpoint such that the new user is looking at the virtual environment as if viewed by an Avatar representing the new user in the virtual environment.

13. The method of claim 12, wherein the vertical field of view restriction is adjustable based on the position of the Avatar within the virtual environment.

14. The method of claim 13, wherein the vertical field of view restriction has an upper limit and a lower limit, wherein the upper limit is increased as the new user approaches a tall object to enable the new user to look farther up at the tall object, and wherein the lower limit is decreased as the new user approaches a short object to enable the new user to look farther down at the short object.

15. The method of claim 12, wherein the new user may turn off the vertical field of view restriction.

16. The method of claim 1, wherein placement of the controls of the limited set of controls is not affected as the set of controls is increased so that the new user does not need to re-learn where the controls are located as the set of controls is increased.

* * * * *